Figure 1:
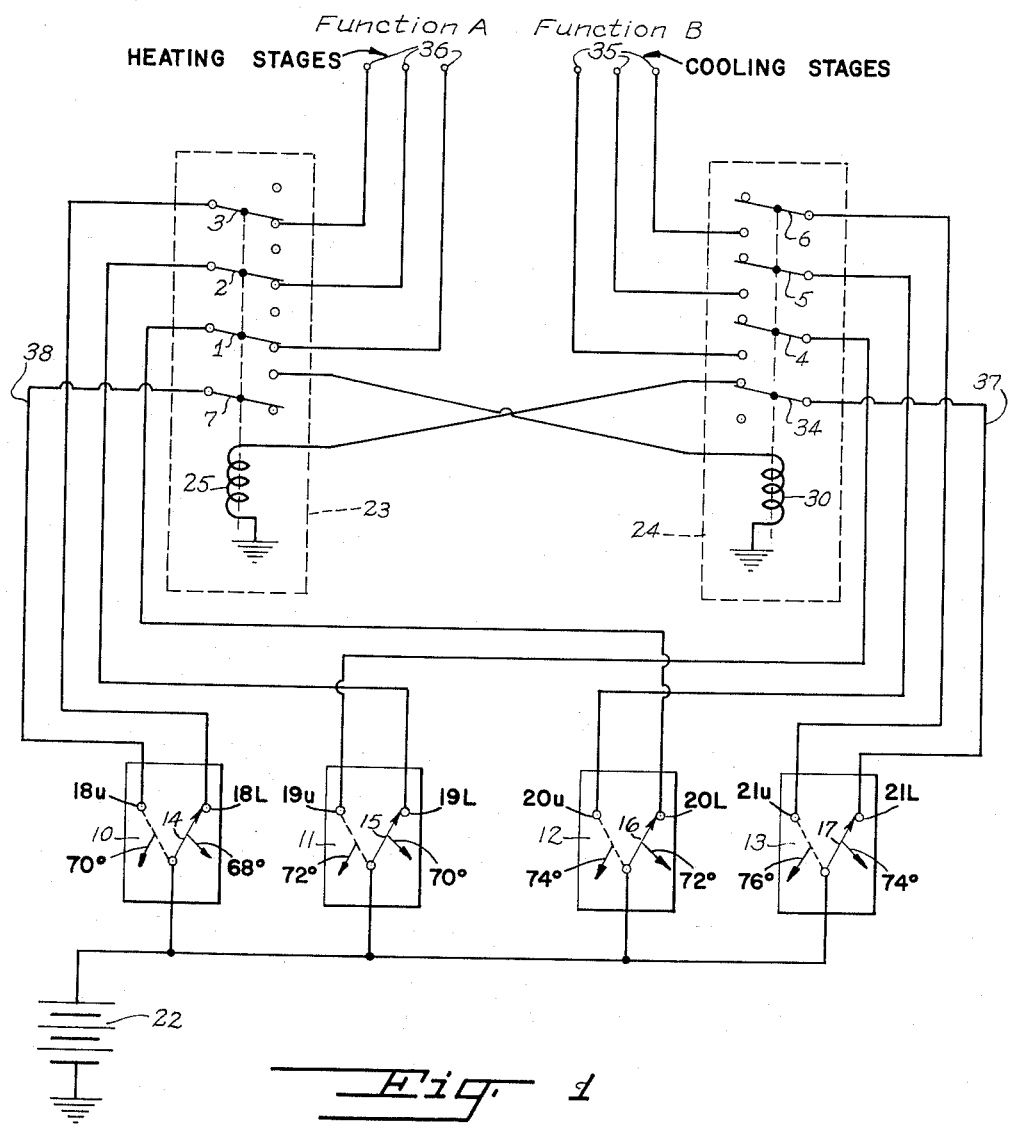

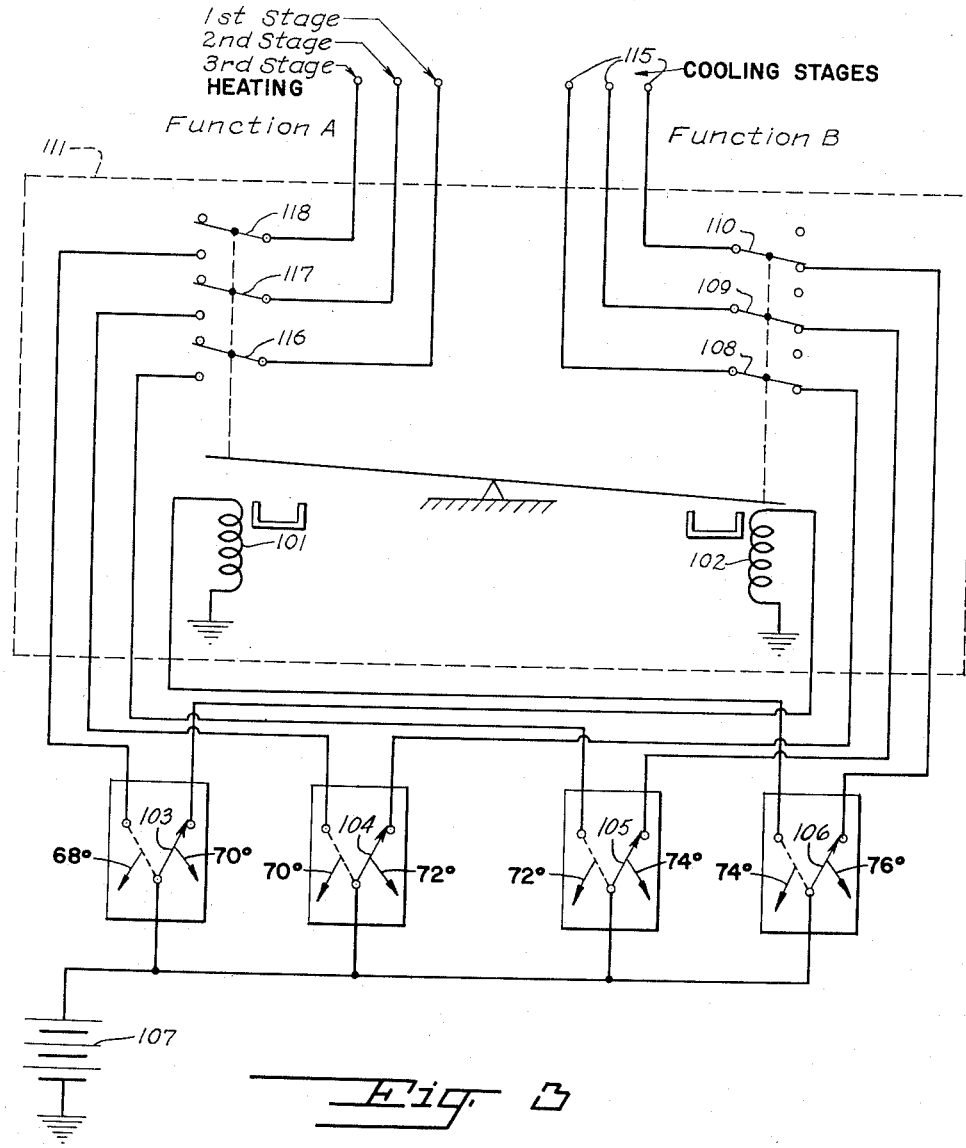

United States Patent Office 3,004,709
Patented Oct. 17, 1961

3,004,709
CONTROL CIRCUIT FOR A CONDITION
REGULATION SYSTEM
James E. Hays, Prince Georges County, Md., assignor to ACF Industries, Incorporated, New York, N.Y., a corporation of New Jersey
Filed Mar. 29, 1957, Ser. No. 649,550
7 Claims. (Cl. 236—1)

This invention relates broadly to automatic control circuits and more particularly to temperature and humidity control circuits particularly adapted to multistage air conditioners used to vary the controlled conditions in accordance with some other variable.

The problem of maintaining the temperature, humidity or any ambient condition in a given volume within a selected range under circumstances where a single unit does not provide sufficient capacity is solved by using two or more units operable as stages. The purpose of the instant automatic multistage control circuit is to provide on-off switching for a plurality of stages of, for example, heating and cooling in such a manner as to cause a preselected condition range to be maintained in accordance with some other variable such as ambient temperature.

The usual method of controlling two or more stages of heating and cooling is by a motor driven cam-switch controlled by a thermosensing device having feedback compensation, or a balanced bridge type circuit whereby control is realized proportionate to ambient conditions error as compared with a standard. This method although accurate is expensive and bulky and does not have any method of change of control point depending upon load, as for example heating or cooling load, without the use of additional components.

Compensation control is the term applied to the practice of varying the controlled conditions in accordance with some other variable. This variation may or may not be linear, the linearity being in accordance with the requirements. As applied to air conditioning, for example, it is customary in compensated systems to vary the conditioned room temperature in accordance with outside temperature such that when the outside temperature is high, a higher room temperature is maintained and vice versa. This practice serves two purposes, (1) to prevent excessive thermal shock to occupants entering and leaving and, (2) to reduce operating costs.

To provide compensated control on the prior art control systems requires additional equipment such as anticipatory sensing devices, wiring, resistors, etc. With the instant automatic multistage control, compensation is inherent due to the principle of operation, i.e., one does not select or set the controls for a particular temperature that is to be maintained, but instead, selects a range within which the stages will operate. The actual operation, then, is such that a balance is maintained between the heat gains or losses and the number of stages in operation. This will occur at different temperatures within the range and will be directly proportional to the heat loads which in turn are proportional to the outside ambient temperature and perhaps other variables such as occupancy, time of day, operation of equipment, etc., which makes the obtained compensation inherently approach the optimum.

The multistage automatic control circuit disclosed herein is a completely new approach to the problem and, summarily stated, consists of an automatic control circuit particularly adapted for multistage air conditioners and the like comprising a plurality of condition responsive devices equal in number to one plus the number of stages and which may be thermostats or humidistats. A pair of interlocking relays having operating coils and an array of contactors are provided, and a plurality of circuits are connected between the relay contactors and the air conditioner stages. A source of energy is selectively connectable by the devices to the relays to energize the same whereby the energy is supplied to the air conditioner stages to thereby oppose any change in the characteristic away from a preselected value range.

It is a broad object of the invention to provide an automatic control circuit responsive to ambient conditions whereby changes in the ambient conditions in response to some other variable will energize selected circuits to oppose such change.

Another object of the invention is to provide an automatic control circuit which may be utilized for regulating temperature, pressure, or humidity conditions within a preselected range.

A further object of the invention is to provide an automatic control circuit usable to maintain an ambient condition, which circuit has portions thereof responsive to the condition and thereby takes into consideration the load on the system.

A still further object of the invention is to provide an automatic control system circuit of small size and weight for simplicity of operation and low initial cost.

A yet further object of the invention is to improve on the automatic control circuit now in use.

The invention will be more fully set forth in the following description referring to the accompanying drawings, and the features of novelty will be pointed out with particularity in the claims annexed to and forming part of this specification.

Figure 2:
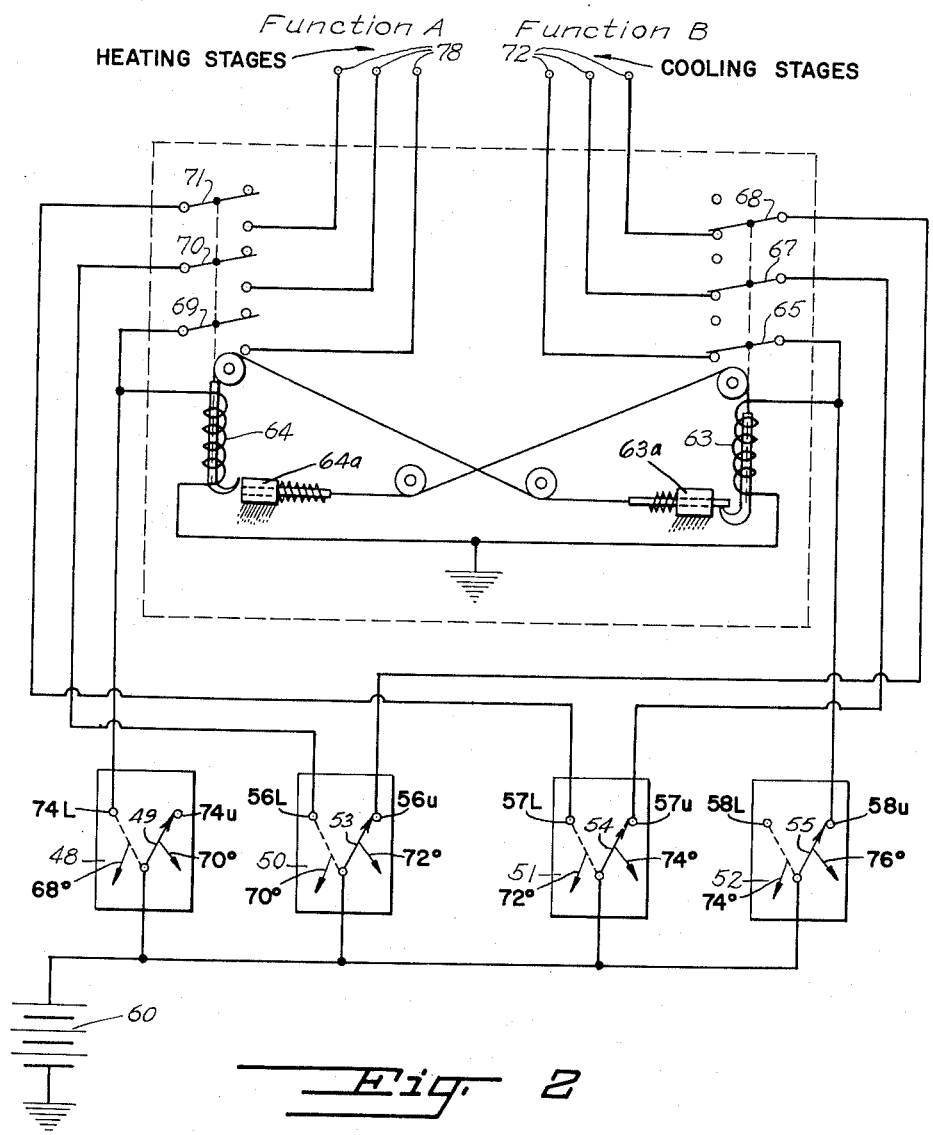

The drawings show preferred schematic presentations of the invention in which:

FIGURE 1 is a schematic wiring diagram of the automatic control circuit in accordance with this invention as applied to a temperature control, and, FIGURE 2 is a schematic wiring diagram of a modified version of the automatic control circuit as applied to a humidity control, and, FIGURE 3 is a wiring diagram of a species of the control circuit.

In order to control a multiplicity of stages for a given condition change device without overlapping the range of each stage and without widening the total range to unacceptable limits, a control element, for example a thermostat, of narrow differential must be used, and the differential between control elements must be kept to a minimum. If the control elements are double throw devices where the opposite throw is used for an alternate function, then it is obvious that when only one stage of one condition changing device is operating then the other control elements will be calling for the opposite change and unless some interlocking system is available, both condition changes will be attempted at the same time.

As will be more fully pointed out hereinafter the disclosed circuit automatically controls the several stages in accordance with a predetermined variable such as system load or external temperature.

Referring now to the drawings wherein like or similar parts are designated by like reference characters, 10, 11, 12 and 13 represent four bimetallic type thermostat switches. For the purpose of illustration the units have single throw arms 14, 15, 16 and 17 respectively movable between double contacts 18u and 18L, 19u and 19L, 20u and 20L, and 21u and 21L. The letter u appended to the contact reference character numeral designates that contact is established between it and the movable arm at the upper limit of condition for which that switch is preset while the letter L appended designates contact at the lower limit for that switch. A source of energy 22 is connected at one end thereof to the respective arms, and connections from the several pairs of contacts are brought out to interconnect with a pair of relays 23 and 24 respectively. The several relays each have an operating coil 25 and 30 and an assemblage of single pole single throw switches. It will be noted that the bottom pair of relay switches 33 and 34 are respectively cross connected to the operating coil of the other relay whereby an electrical interlock is realized. For the purpose of this specification relay 24 will be designated as the cooling relay (condition change B) and 23 as the heating relay (condition change A) to indicate the service supplied thereby. An array of conductors 35 lead from the cooling relay contactors to three stages of a multistage cooling apparatus (not shown). Similarly, conductors 36 connect between the contacts of the heating relay 23 and three stages of a heating unit (not shown). In general, the number of thermostats equals the number of stages plus one.

Each of the condition responsive units 10 to 13 inclusive is set to operate its contacts at a different characteristic range; the difference between the highest temperature setting and the lowest being the total range of operation of the system. For example, if the temperature ambient to condition sensitive switchese 10, 11, 12 and 13 were to be controlled, elements 14, 15, 16 and 17 would be temperature sensitive elements and might be set to move to the upper terminals 18$u$, 19$u$, 20$u$ and 21$u$ at temperatures of 70°, 72°, 74° and 76°, respectively, and alternatively to 18L, 19L, 20L and 21L at temperatures of 68°, 70°, 72° and 74°. These values are shown in FIG. 1 as a typical example. As there shown, the operating coil 25 of heating relay 23 is connected by conductor 37 through contactor 34 to thermostat 13, and similarly operating coil 30 of cooling relay 24 is connected through contactor 7 and conductor 38 to one pole of thermostat 10. Units 10 and 13 are responsive to the maximum and minimum temperature condition in a predetermined temperature range. Upon the energizing of an operating coil through a thermostat responsive to one characteristic extreme a series of circuits is prepared leading to stages of a multistage air conditioner. Upon system demand for further correction capacity more and more stages will be connected automatically by the response of the several thermostats.

*Operation*

The illustrated application makes use of the electrical interlock principle wherein the relay coil for each of the heating and cooling functions is connected in series with a normally closed contact on the relay of the opposite condition change device. This prevents the operation of both condition change devices simultaneously even though the controlling elements are calling for both changes.

Elements 14, 15, 16 and 17 which may be the usual bimetallic type are sensitive to the medium being controlled and are responsive to a condition to control the medium by operating condition change devices A or B. This operation is effected by a single pole double throw snap acting switch operation. The elements are all shown in positions which would result in element 17 operating relay 23 by connecting power source 22 to the coil 25 of the relay through the interlocking contact 34 of relay 24. Elements 16, 15 and 14 operate respective stages of condition change device A through contacts 1, 2 and 3 of relay 23 by connecting power source 22 through conductors 36 to these stages of condition change device A. As described above the full capacity of condition change device A is being utilized. When the requirements for this change diminish as by reduction of load or temperature gradient the measure of the controlled medium which might be temperature, pressure, humidity, etc. will act upon element 14 to cause motion thereof away from the position shown. As soon as the magnitude of the recession exceeds the differential of the sensing element 14 the element will change position causing the switching action previously explained. This action will stop a stage of condition change device A and will attempt to energiz relay 24 for condition change device B. This however is prevented by the normally closed contacts 7 of relay 23 which are in the relay energized or open position. As the requirements diminish further elements 15 and 16 will change position turning off respective stages of condition change device A. At the same time the switching action will attempt to operate the stages of condition change B; however this is prevented because contacts 4, 5, and 6 are held in the open position until operating coil 30 is energized. Note that at any point within this portion of the controlled range that the requirements for condition change A can increase causing more stages to be energized, and decrease causing fewer stages to be energized, or can dwell with none, all, or part of the stages energized. When the requirements for condition change A change to requirements for condition change B by continuing to recede below the point where the first stage is deenergized then element 17 will change position. This deenergizes relay coil 25 and when the deenergized position is reached interlocking contact 7 of relay 23 will complete the energizing circuit for coil 30 of relay 24. When relay coil 30 is energized the contacts 4, 5 and 6 will transmit energy from elements 15, 16 and 17 to the stages of condition change device B through conductors 35. This results in all stages of condition change device B being energized, which will quickly reestablish control. In this position a condition equivalent to the previously described condition is realized wherein all stages of condition change A were energized. The operation of the organization as the requirements for condition change B diminish will also be similar to that previously described. It will be noted that a change of condition correction takes place only when a requirement for change of condition correction occurs since there is a portion of the range before changeover during which no stages of either condition change device is energized. The changeover occurs at opposite ends of the controlled range which precludes the alternate changing from one device to another in the erratic and unscheduled manner referred to as hunting.

Another method of affecting this type of control is shown in FIGURE 2. This circuit makes use of the well known latching relay principle wherein once the relay is energized the armature is mechanically caught and held so that it remains in the position even after it is deenergized. To return the relay to the deenergized position it is necessary to energize the releasing coil that releases the mechanical latch holding the relay in position. In FIGURE 2 is shown a latching type composed of two triple pole double throw switch banks mounted so that the armature of each relay acts as a mechanical latch for the other, hence when either bank is energized it will remain in the energized position even though no electrical energy is transmitted to its coil until the opposite bank is energized. In operation, a source of electrical energy 60 is connected to sensing elements 49, 53, 54 and 55 which in turn operate as single pole double throw snap acting switches. As there shown elements 53, 54 and 55 will transmit electrical energy to stages of change device B. Note that element 55 also supplied electrical energy to the operating coil 63 of the relay. As the requirement for change B is reduced element 55 will change position thus deenergizing a stage and the coil 63. However, two stages will continue to operate since the relay remains in the energized position due to the mechanical latching 63$a$. As the requirements for change B are further reduced elements 54 and 53 will deenergize the remaining stages. At this point no stages of either device are energized and if the requirements for change B are further reduced beyond a fixed differential which exists between the cut-off point of a stage of change device B and the switchover point of change device A then element 49 will change position so as to supply electrical energy to a stage of change device A. At the same time element 49 supplies electrical energy to the operating coil 64 of the relay causing it to move to the energized position and mechanically freeing the other bank of contacts which move to the deenergized position by releasing latch 63a. Since elements 54 and 53 are already positioned so as to supply electrical energy to stages of change device A through contacts 69 and 70 these stages will also be energized when the relay closes. Correspondingly, a mechanical latch 64a operates upon relay switch 64 to hold it on until relay 63 is energized.

As the requirements for change A diminish the operation is similar to that previously described for change B and as can be seen the overall result is the same as that gained by the method of FIGURE 1.

Operation of the multistage control may also be illustrated by the electrical circuit shown in FIGURE 3. This circuit makes use of a special relay of a type using a walking beam type armature reference character 100 and two energizing coils (101 and 102). The operation is such that one or both coils may be energized at any time. However the armature will be attracted to the first coil energized and will remain in that position regardless of whether the other coil is energized or not since this will be the narrowest magnetic flux gap. With such an arrangement the requirement for whichever change is in operation will have to be completely satisfied and the functional requirement must change before a change of operation can take place.

As shown in operation in FIGURE 3 sensing elements 103 thru 106 are conveying electrical energy from power source 107 to contactors 108 through 110 of relay 111 respectively which in turn convey the energy to the stages respectively of condition change device B through conductors 115. As the requirement for condition change B diminish element 106 will change position thereby turning off one stage of condition change device B and energizing coil 101 of the relay. This action however, as explained previously, will have no effect on the contact arrangements of the relay. As the requirements for condition change B further diminish sensing elements 105 and 104 will turn off their respective stages. This leaves no stages of either device operating. If the requirement for condition charge B should increase the stage of that device will again be energized by sensing elements 104, 105 and 106 and if the requirements for condition change B should further diminish so as to bring the controlled medium below the differential between elements 103 and 104 then a reversal is required to keep the controlled medium within the specified range. This will occur when sensing element 103 changes position de-energizing coil 102 and energizing a stage of condition change device A. The first two stages of device A will also be energized at this time since sensing elements 103, 104 and 105 are already in position and are conveynig electrical energy to contacts 116, 117 and coil 101 of the relay. The operation is delayed until coil 102 of the relay was deenergized thereby permitting armature 100 to change position. This places all stages of device A in operation whereby control can be quickly re-established. The operation as the requirements for condition change A diminish is the same as previously described for function B. The above described summer-winter operation and compensation is achieved without the use of additional components and control can be adjusted to effectively maintain temperatures within a range of say 2° F. and thereby avoid discomfort caused by sudden variations in temperature of the air supplied to the room being conditioned. The above circuit is applicable to any changeable ambient condition, for example, pressure and it is within the ability of one skilled in the art to substitute pressure responsive devices for the disclosed temperature and humidity responsive devices in the circuit.

While particular arrangements have been illustrated and described modifications will occur to those skilled in the art and it is desired that the invention be not limited to the specific details illustrated and described and intended by the appended claims to cover all modifications which fall within the spirit and scope of the invention.

I claim:

1. A control circuit for a temperature regulation system having a plurality of $n$ or fewer heating means and a plurality of $n$ or fewer cooling means each operable in response to an electrical control signal, a source of electrical energy for said control signals, $n+1$ thermosensitive switch means each having a common terminal connected to said source of electrical energy, an upper terminal switchable to said common terminal for all temperatures in excess of an upper limit, and a lower terminal alternatively switchable to said common terminal for all temperatures lower than a lower limit, the response limits of temperature for each switch being different so as to cover the range over which temperature is to be permitted to vary, a heating control relay switch having electrical actuating means and at least $n+1$ poles, a cooling control relay switch having electrical actuating means and at least $n+1$ poles, means connecting said upper terminal of the thermosensitive switch means having the lowest temperature response limit through a normally closed contact of said heating control relay switch to the electrical actuating means of said cooling control relay switch, means connecting each of the remaining upper terminals through normally open contacts of said cooling control relay switch to each of said cooling means, means connecting said lower terminal of the thermosensitive switch means having the highest temperature response limit through a normally closed contact of said cooling control relay switch to the electrical actuating means of said heating control relay switch, and means connecting each of the remaining lower terminals through normally open contacts of said heating control relay switch to each of said heating means.

2. A control circuit for a condition regulation system having a plurality of $n$ or fewer condition increasing means and a plurality of $n$ or fewer condition decreasing means each operable in response to an electrical control signal, a source of electrical energy for said control signals, $n+1$ condition sensitive switch means each having a common terminal connected to said source of electrical energy, an upper terminal switchable to said common terminal for all conditions in excess of an upper limit, and a lower terminal alternatively switchable to said common terminal for all conditions lower than a lower limit, the response limits of condition for each switch being different so as to cover the range over which condition is to be permitted to vary, an increasing condition control relay switch having electrical actuating means and at least $n+1$ poles, a decreasing condition control relay switch having electrical actuating means and at least $n+1$ poles, means connecting said upper terminal of the condition sensitive switch means having the lowest condition response limit through a normally closed contact of said increasing condition control relay switch to the electrical actuating means of said decreasing condition control relay switch, means connecting each of the remaining upper terminals through normally open contacts of said decreasing condition control relay switch to each of said condition decreasing means, means connecting said lower terminal of the condition sensitive switch means having the highest condition response limit through a normally closed contact of said decreasing condition control relay switch to the electrical actuating means of said increasing condition control relay switch, and means connecting each of the remaining lower terminals through normally open contacts of said increasing condition control relay switch to each of said condition increasing means.

3. A control circuit for a temperature regulation system having a plurality of $n$ or fewer heating means and a plurality of $n$ or fewer cooling means, each operable in response to an electrical control signal, a source of electrical energy for said control signals, $n+1$ thermosensitive switch means each having a common terminal connected to said source of electrical energy, an upper terminal switchable to said common terminal for all temperatures in excess of an upper limit, and a lower terminal alternatively switchable to said common terminal for all temperatures lower than a lower limit, the response limits of temperature for each switch being different so as to cover the range over which temperature is to be permitted to vary, a heating control relay switch having electrical actuating means and at least $n$ poles, a cooling control relay switch having electrical actuating means and at least $n$ poles, latching means operative to hold each relay switch in actuated position unless the other relay switch is actuated, means connecting said upper terminal of the thermosensitive switch means having the highest temperature response limit to the electrical actuating means of said cooling control relay switch and also to one of said cooling means, means connecting $n-2$ of the remaining upper terminals through normally open contacts of said cooling control relay switch to each of the remaining cooling means, means connecting said lower terminal of the thermosensitive switch means having the lowest temperature response limit to the actuating coil of said heating control relay switch and also to one of said heating means, means connecting $n-2$ of the remaining lower terminals through normally open contacts of said heating control relay switch to each of said heating means.

4. A control circuit for a condition regulation system having a plurality of $n$ or fewer condition increasing means and a plurality of $n$ or fewer condition decreasing means, each operable in response to an electrical control signal, a source of electrical energy for said control signals, $n+1$ condition sensitive switch means each having a common terminal connected to said source of electrical energy, an upper terminal switchable to said common terminal for all conditions in excess of an upper limit, and a lower terminal alternatively switchable to said common terminal for all conditions lower than a lower limit, the response limits of condition for each switch being different so as to cover the range over which condition is to be permitted to vary, an increasing condition control relay switch having electrical actuating means and at least $n$ poles, a decreasing condition control relay switch having electrical actuating means and at least $n$ poles, latching means operative to hold each relay switch in actuated position unless the other relay switch is actuated, means connecting said upper terminal of the condition sensitive switch means having the highest condition response limit to the electrical actuating means of said decreasing condition control relay switch and also to one of said condition decreasing means, means connecting $n-2$ of the remaining upper terminals through normally open contacts of said decreasing condition control relay switch to each of the remaining condition decreasing means, means connecting said lower terminal of the condition sensitive switch means having the lowest condition response limit to the actuating coil of said condition increasing control relay switch and also to one of said condition increasing means, and means connecting $n-2$ of the remaining lower terminals through normally open contacts of said increasing condition control relay switch to each of said condition increasing means.

5. A control circuit for a temperature regulation system having a plurality of $n$ or fewer heating means and a plurality of $n$ or fewer cooling means each operable in response to an electrical control signal, a source of electrical energy for said control signals, $n+1$ thermosensitive switch means each having a common terminal connected to said source of electrical energy, an upper terminal switchable to said common terminal for all temperatures in excess of an upper limit, and a lower terminal alternatively switchable to said common terminal for all temperatures lower than a lower limit, the response limits of temperature for each switch being different so as to cover the range over which temperature is to be permitted to vary, a heating control relay switch having electrical actuating means, a movable element, and at least $n$ poles, a cooling control relay switch having electrical actuating means, a movable element and at least $n$ poles, mechanical interconnecting means between the movable element of said heating control relay and the movable element of said cooling control relay permitting one to be actuated only if the other is not actuated, means connecting said upper terminal of the thermosensitive switch means operable in the lowest temperature range to the electrical actuating means of said cooling control relay switch, means connecting the remaining upper terminals through normally open contacts of said cooling control relay switch to each of said cooling means, means connecting said lower terminal of the thermosensitive switch means operable in the highest temperature range to the electrical actuating means of said heating control relay switch, and means connecting the remaining lower terminals through normally open contacts of said heating control relay switch to each of said heating means.

6. A control circuit for a condition regulation system having a plurality of $n$ or fewer condition increasing means and a plurality of $n$ or fewer condition decreasing means each operable in response to an electrical control signal, a source of electrical energy for said control signals, $n+1$ condition sensitive switch means each having a common terminal connected to said source of electrical energy, an upper terminal switchable to said common terminal for all conditions in excess of an upper limit, and a lower terminal alternatively switchable to said common terminal for all conditions lower than a lower limit, the response limits of condition for each switch being different so as to cover the range over which condition is to be permitted to vary, a condition increasing control relay switch having electrical actuating means, a movable element, and at least $n$ poles, a decreasing condition control relay switch having electrical actuating means, a movable element and at least $n$ poles, mechanical interconnecting means between the movable element of said increasing condition control relay and the movable element of said decreasing condition control relay permitting one to be actuated only if the other is not actuated, means connecting said upper terminal of the condition sensitive switch means operable in the lowest condition range to the electrical actuating means of said decreasing condition control relay switch, means connecting the remaining upper terminals through normally open contacts of said decreasing condition control relay switch to each of said condition decreasing means, means connecting said lower terminal of the condition sensitive switch means operable in the highest condition range to the electrical actuating means of said condition increasing control relay switch, and means connecting the remaining lower terminals through normally open contacts of said increasing condition control relay switch to each of said condition increasing means.

7. A control circuit for a condition regulation system having a plurality of condition increasing means and a plurality of condition decreasing means, each operable in response to an electrical control signal, a source of electrical energy for said control signals, a plurality of condition sensitive switch means each having a common terminal connected to said source of electrical energy, an upper terminal switchable to said common terminal for all conditions in excess of an upper limit, and a lower terminal alternatively switchable to said common terminal for all conditions lower than a lower limit, the response limits of condition for each switch being different so as to cover the range over which condition is to be permitted to vary, an increasing condition control relay switch having electrical actuating means and a plurality of poles, a decreasing condition control relay switch having electrical actuating means and a plurality of poles, means connecting a plurality of said upper terminals through normally open contacts of said decreasing condition control relay switch to said condition decreasing means, means connecting a plurality of said lower terminals through normally open contacts of said increasing condition control relay switch to said condition increasing means, means to actuate said increasing condition relay switch and deactuate said decreasing condition relay switch when all of said condition decreasing means have been disconnected, and means to actuate said decreasing condition relay switch and deactuate said increasing condition relay switch when all of said condition increasing means have been disconnected.

References Cited in the file of this patent

UNITED STATES PATENTS

| | | |
|---|---|---|
| 2,083,585 | Winther | June 15, 1937 |
| 2,147,639 | Dewey | Feb. 21, 1939 |
| 2,335,071 | Lynch | Nov. 23, 1943 |
| 2,366,500 | Eastin | Jan. 2, 1945 |
| 2,776,543 | Ellenberger | Jan. 8, 1957 |
| 2,806,674 | Biehn | Sept. 17, 1957 |